3,535,027
SLIT LAMP WITH PANCRATIC ILLUMINATION
Hans Littmann, Heidenheim, and Gert Littmann, Oberkochen, Germany, assignors to Carl Zeiss-Stiftung, doing business as Carl Zeiss, Heidenheim (Brenz), Wurttemberg, Germany, a corporation of Germany
Filed July 29, 1968, Ser. No. 748,485
Claims priority, application Germany, Aug. 2, 1967, 1,572,902
Int. Cl. A61b 3/10; G02b 15/16, 27/10
U.S. Cl. 351—14                    2 Claims

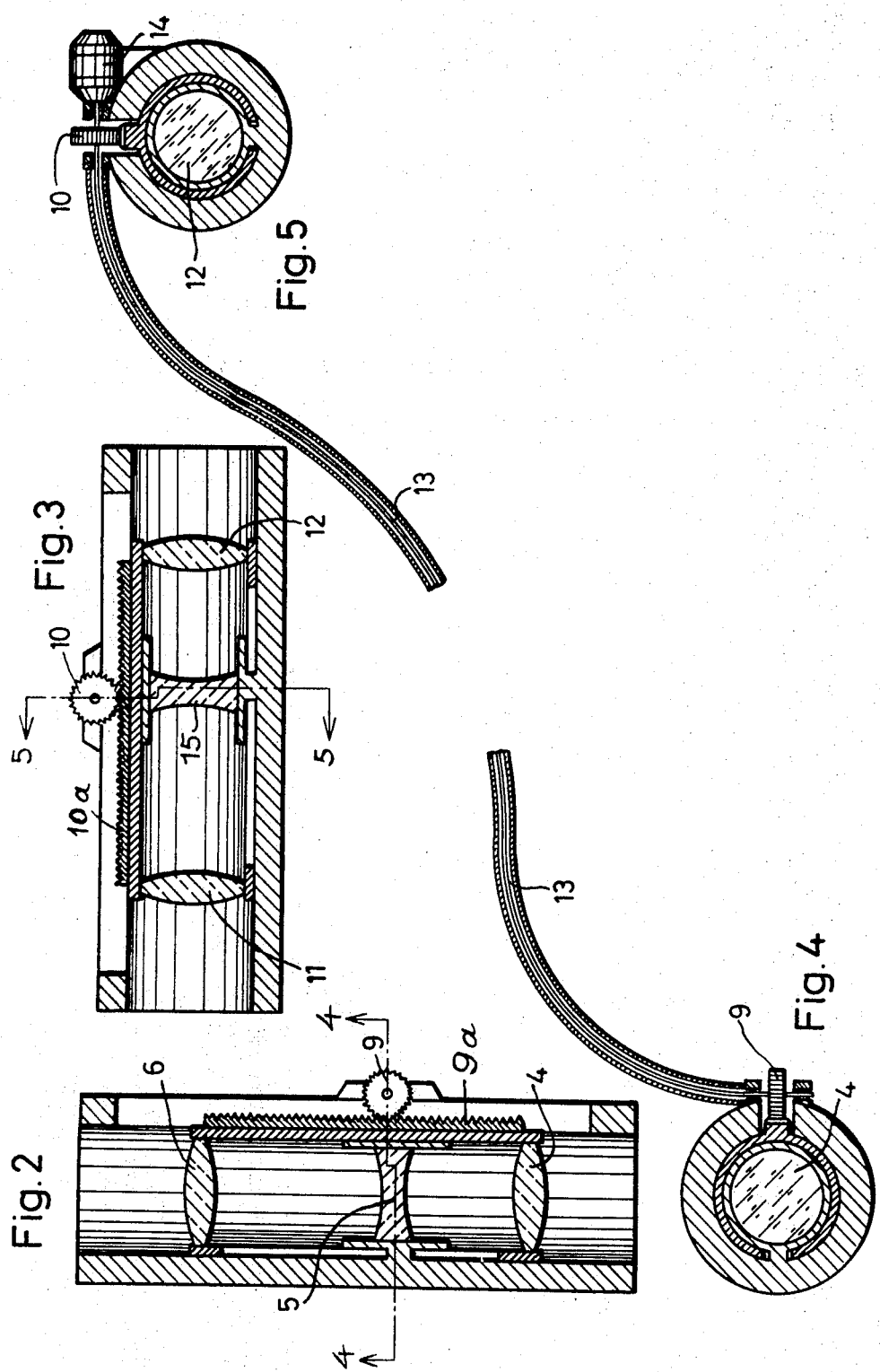

ABSTRACT OF THE DISCLOSURE

A slit lamp for eye examination in which a pancratic lens system in an illumination unit including an illuminated slit means is operatively coupled with a pancratic lens system in an observation unit including an observation microscope in such a manner as to cause alteration of the magnification ratio of one of said lens systems to change the magnification ratio of the other lens system in the inverse sense.

---

Figure 1:
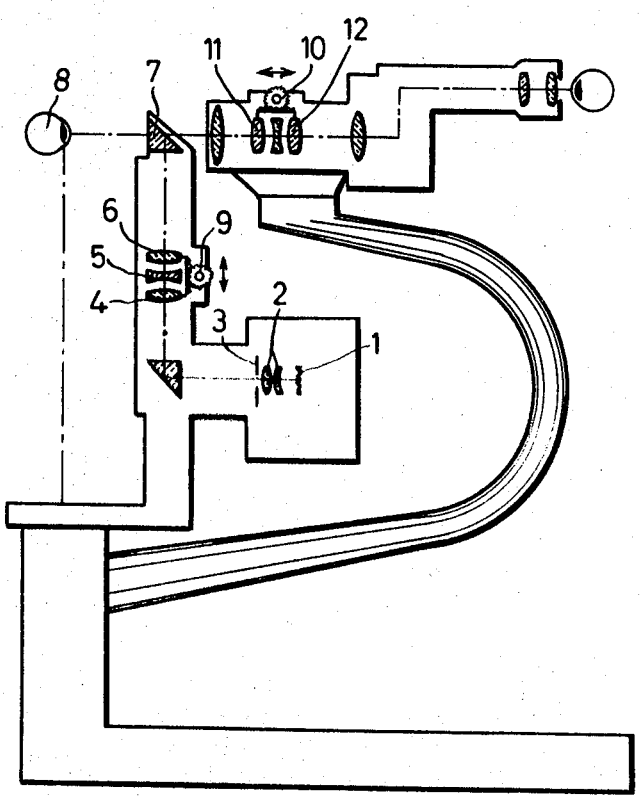

The present invention relates to a slit lamp for eye examination which may be constructed both as a simple slit lamp for purely visual use with a single light source, preferably an incandescent lamp, and a photo slit lamp employing two light sources, namely an incandescent lamp and a gas discharge lamp.

As a rule, the prior art slit lamps are equipped with an illuminating system having a fixed image scale for the slit image formation. The brightness control is effected by varying the brightness of the light source and/or by changing the illumination aperture. A slit lamp has already been disclosed (DAS 1,187,038) in which an image of the slit is selectively formed in two different magnifications, one of which is the reciprocal value of the other. This arrangement, however, is only satisfactory if likewise only a maximum of two magnifications is available for observation and photography, respectively. Generally, however, the more recent devices are provided with magnification changers employing several steps or with a pancratic magnification changer in the imaging path of rays of the associated corneal microscope. For these devices the prior art illumination arrangements are insufficient for the reasons that:

(a) For small magnification of observation the field of view is larger than the illuminated field so that the slit image only illuminates a portion of the field of view.
(b) For great magnification of observation the field of view is smaller than the illuminated field. Therefore, in such a case, also the environmental field of the project is illuminated, a fact which is detrimental to the image formation of the object.

It is an object of the present invention to provide an optimum adjustment of illuminated field size and field of view size. In this connection the fact is to be taken into consideration that, as a rule, the aperture of the observation path of rays becomes the smaller the more the magnification of observation increases. This involves the necessity of increasing the intensity of illumination in the object with increasing magnification, namely to such an extent that the observer's sensation of brightness remains at least approximately constant when the magnification of observation is changed.

According to the present invention, this object is attained by the provision of a manually or motor-actuated pancratic illuminating system by which the image scale and, accordingly, the intensity of illumination of the slit image is continuously changed. Preferably, the pancratic illuminating system is so dimensioned that the light reflux coming from the slit is received and passed on without any loss. Then the intensity of illumination in the slit image increases quadratically with the decrease in the illuminated field diameter so that an increase in brightness is achieved by a factor in the order of a magnitude of 20 with respect to the initial brightness, when using a pancratic ratio of 1:4 or 1:5, without placing an additional burden on the light source. An additional advantage of the arrangement according to the invention resides in the fact that by the optical reduction of the slit image with great magnification of observation a substantially sharper light section is presented to the observer than can be produced with conventional means. Moreover, the depth of focus of the slit image can always be optimally adjusted to the depth of focus of the observation.

The aforesaid advantages are equally significant both for visual and photographic slit lamp microscopy; they are particularly significant for the latter, as the photography of the slit image for photographic magnifications with conventional means met with substantial basic difficulties because the necessary increase in the intensity of illumination in the slit image was attainable only by an increased burdening of the light source which soon reaches its natural lights.

A further object of the invention resides in the provision of a mechanical or electric coupling of the magnification changer located in the observation path of rays, with the pancratic illuminating system. This coupling is so constructed that, when the magnification of observation is changed, the magnification of the slit image is automatically changed synchronously in an opposite sense. To this end an arrangement is preferred in which a pancratic system is provided both in the illumination path of rays and the observation path of rays, each of these systems being actuated by a rotating element.

The preselected ratio between slit image expansion and size of the field of view can be maintained in a coupled state of the two systems throughout the whole range of magnification. Normally, a ratio of 1:1 will be started from. In accordance with a still further object of the invention the releasable coupling of the pancratic drive systems has associated therewith an elastic element, upon actuation of which in a disengaged state the preselected ratio is automatically re-established. With a strictly electrical coupling, when switching on the synchronous actuation of the two drive systems any desired pre-selected ratio of the diameters of the illuminated field and the field of view may be re-established also with the aid of limit switches.

The invention will further be described with reference to the accompanying drawings which illustrate an embodiment of the present invention.

In the drawings:
FIG. 1 illustrates diagrammatically a side elevation view of the slit lamp device;
FIG. 2 is an enlarged axial sectional view of the pancratic lens system in the slit projection system;
FIG. 3 is an enlarged axial sectional view of the pancratic lens system in the microscope, and
FIGS. 4 and 5 are cross-sections along the broken lines 4—4 and 5—5 of FIGS. 2 and 3, respectively.

Referring to FIG. 1, a slit lamp of conventional construction is provided with an illuminating arrangement 1–7 disposed within a bracket which is pivotally mounted about a vertical axis in front of the objective of the corneal microscope. At 1 is indicated the light source or an image of the light source. In slit lamps having two light sources, one light source coincides with the image of the other light source at this location. The light collector 2 images the light source into the vertically disposed optical system 4, 5, 6 which in turn projects an image of the slit 3 onto the patient's eye 8 by means of the prism 7. The optical system 4, 5, 6 comprises a pancratic projection system, the axially moving elements 4 and 5 of which are actuated by a rotating element 9. Another pancratic system 11, 12, 15 is provided in the horizontal path of rays of the corneal microscope. Its axially moving elements 11 and 12 are actuated by a rotating element 10. The rotating elements 9 and 10 have the form of pinions which mesh with toothed rack bars connected with the moving lens elements. The pancratic system 11, 12, 15 constitutes a magnification changer.

The FIGS. 2 and 3 illustrate longitudinal sectional views of the two pancratic lens systems in an enlarged scale and indicate clearly in what manner the axially spaced movable optical systems are axially adjusted by the gear rack drives 9, 9a and 10, 10a respectively.

The FIGS. 4 and 5 illustrate the manner in which the two rotating elements 9 and 10 are coupled with each other by means of a flexible shaft 13 which is adapted to be rotated by a drive motor 14 connected to one end of the flexible shaft 13. The flexible shaft 13 forms a releasable coupling with the two rotating elements 9 and 10 respectively.

What we claim is:

1. In a slit lamp for eye examination, a base, a substantially vertical illumination unit mounted on said base for pivotal movement about a vertical axis, a substantially horizontal observation unit mounted on said base for pivotal movement about said vertical axis, means defining a narrow slit mounted in said illumination unit, a light source at one side of said slit means in a position to transmit rays of light through said slit, a transparent reflector member in said illumination unit in the path of said light rays and in a position to reflect said light rays toward the eye being examined and form a slit image thereon, a first pancratic lens system in said illumination unit in the path of said light rays between said narrow slit and said reflector member, first adjustment means associated with said first pancratic lens system and operable to adjust the magnification ratio thereof, an observation microscope in said observation unit in position to permit observation of the eye being examined through said transparent reflector member, a second pancratic lens system in said observation unit between said microscope and said transparent reflector member, second adjustment means associated with said second pancratic lens system and operable to adjust the magnification ratio thereof, and coupling means interconnecting said first and second adjustment means and operable to alter the magnification ratio of said first pancratic lens system inversely to alteration of the magnification ratio of said second pancratic lens system, whereby the intensity of illumination of said slit image on the eye increases quadratically with the decrease in size of said slit image and thus an increase in brightness of said slit image is achieved without placing an additional burden on said light source.

2. A slit lamp as set forth in claim 1, in which said coupling means includes a flexible shaft, two gear wheels secured to said flexible shaft at a distance from each other, bearing means rotatably supporting said flexible shaft on said illumination unit and on said observation unit, first mounting means slidably supporting at least one of the lenses in said illumination unit, second mounting means slidably supporting at least one of the lenses in said observation unit, and a gear rack secured to each of said first and second mounting means in operative engagement each with one of said two gear wheels.

References Cited

UNITED STATES PATENTS 2,235,319   3/1941   Jobe _____ 351—16 X
2,729,141   1/1956   Walker _____ 350—187 X

OTHER REFERENCES

Elmstrom, G. P., "What's New," J. Amer. Optom. Assoc., vol. 35, No. 4, April, 1964, p. 345–346.

Littmann, H., "Ein . . . Zoom-System," Klinische Monatsblätter fur augenheil knude, vol. 150, pp. 901–905, July 1967.

DAVID SCHONBERG, Primary Examiner

P. A. SACHER, Assistant Examiner

U.S. Cl. X.R.

350—187, 235; 351—16

UNITED STATES PATENT OFFICE
CERTIFICATE OF CORRECTION

Patent No. 3,535,027          Dated October 20, 1970

Inventor(s) Hans Littmann et al.

It is certified that error appears in the above-identified patent and that said Letters Patent are hereby corrected as shown below:

Column 2, line 25, "lights" should read -- limits --.

Signed and sealed this 1st day of June 1971.

(SEAL)
Attest:

EDWARD M. FLETCHER, JR.          WILLIAM E. SCHUYLER, JR.
Attesting Officer          Commissioner of Patents